United States Patent
Peron

(10) Patent No.: US 6,294,901 B1
(45) Date of Patent: *Sep. 25, 2001

(54) POWER DIMMER

(75) Inventor: Benoît Peron, Tours (FR)

(73) Assignee: SGS-Thomson Microelectronics S.A., Gentilly (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/066,164

(22) Filed: Apr. 24, 1998

(30) Foreign Application Priority Data

Apr. 29, 1997 (FR) .................................. 97 05593

(51) Int. Cl.[7] .................................................... G05F 1/455
(52) U.S. Cl. ................................................................ 323/239
(58) Field of Search ................................. 323/235, 237, 323/238, 241, 239, 324; 315/307, 308, DIG. 4, 194

(56) References Cited

U.S. PATENT DOCUMENTS

| 3,161,759 | * | 12/1964 | Gambill et al. ................ 323/324 |
| 3,201,597 | * | 8/1965 | Balan ................................ 323/324 |
| 3,440,445 | * | 4/1969 | Kusa ................................ 323/324 |
| 3,952,241 | * | 4/1976 | Takemura et al. ................ 315/307 |
| 4,061,961 | * | 12/1977 | Baker ................................ 323/324 |
| 4,162,440 | * | 7/1979 | Luteran ............................ 323/324 |
| 4,504,778 | | 3/1985 | Evans ................................ 323/323 |
| 4,870,340 | | 9/1989 | Karal ................................ 323/235 |
| 4,876,498 | | 10/1989 | Luchaco et al. ................ 323/300 |
| 4,954,768 | | 9/1990 | Luchaco et al. ................ 323/300 |
| 5,023,516 | * | 6/1991 | Ito et al. ............................ 315/101 |
| 5,072,170 | | 12/1991 | Crane et al. ...................... 323/235 |
| 5,107,184 | * | 4/1992 | Hu et al. ............................ 315/291 |
| 5,519,263 | * | 5/1996 | Santana, Jr. ...................... 315/361 |
| 5,657,195 | * | 8/1997 | Rault ................................ 361/86 |
| 5,754,036 | * | 5/1998 | Walker ............................ 323/237 |
| 5,757,145 | * | 5/1998 | Johnson et al. .................. 315/308 |

* cited by examiner

Primary Examiner—Jeffrey Sterrett
(74) Attorney, Agent, or Firm—Wolf, Greenfield & Sacks, P.C.; James H. Morris; Theodore E. Galanthay

(57) ABSTRACT

The present invention relates to a power dimmer of a load, powered by an a.c. voltage, of the type including a bidirectional switch associated in series with the load, the switch being normally closed and controllable to be opened upon each halfwave of the a.c. voltage.

23 Claims, 4 Drawing Sheets

POWER DIMMER

BACKGROUND OF THE INVENTION

1. Field of the Invention

The present invention relates to the field of power dimmers for modulating the operating power of an essentially resistive load, for example, a lamp, powered by an a.c. voltage, for example, the mains voltage.

2. Discussion of the Related Art

FIG. 1 shows a basic diagram of a conventional light dimmer. Such a dimmer is most often based on the use of a triac 1 operating as a bidirectional switch, open in the idle state, connected in series with an incandescent or halogen lamp 2 between two a.c. supply terminals 4, 5.

Triac 1 is controlled by a circuit (CONTROL) 3, the function of which is to supply to gate G of triac 1 closing pulses at a frequency corresponding to double the frequency of supply voltage v. Circuit 3 is generally powered from the a.c. voltage by means of connections 6, 7, respectively, to terminal 4 and to the midpoint 8 of the series association of lamp 2 and of triac 1. Circuit 3 is associated with means (not shown), generally manually controlled, for setting the time of occurrence of the pulses with respect to the beginning of each halfwave of the supply voltage.

The operation of the power dimmer shown in FIG. 1 is illustrated by FIG. 2 which shows, in the form of a timing diagram, an example of the current i in lamp 2 and of control voltage v1 of triac 1. Signal v1 corresponds to a pulse train of amplitude V1.

In the absence of a triggering current in gate G of triac 1, the triac is blocked (non-conducting) and no current flows through lamp 2 (neglecting the supply current of circuit 3 which is very low due to the high resistance of lamp 2 and which causes no lighting thereof).

At the beginning of a mains halfwave (shown in dotted lines in FIG. 2), there is thus no current in the lamp. At a time t1, corresponding to the rising edge of a pulse P of signal v1, triac 1 turns on and current i in the lamp grows very rapidly to follow the mains sine wave. Triac 1 turns off at the end of the halfwave (time t2) and turns back on upon occurrence of the following pulse of signal v1.

A problem which arises in such a power dimmer is that the turning-on of the triac causes radioelectric disturbances on the mains, due to the current peaks which occur upon each closing of triac 1.

To solve this problem, an inductive and capacitive filter is generally used.

FIG. 3 shows an example of conventional power dimmer provided with such a filter.

An inductance L is interposed between lamp 2 and triac 1, to smooth the current peaks upon closing of triac 1. Inductance L is associated with a capacitor C connected in parallel on the series connection of inductance L and of triac 1, that is, connected between terminals 4 and 8. Capacitor C is used to limit the energy in inductance L. The association of inductance L and of capacitor C forms what is generally called a mains filter.

A disadvantage of using such a mains filter in a power dimmer is that inductance L is a particularly bulky and expensive component. Further, the inductance is not integrable.

Another disadvantage is that the inductance introduces an effect of lamp "flicker" when the dimmer is set at low power. Indeed, at low power, the hold current of the triac is higher than the current through the inductance, which causes oscillations upon switching of the triac.

SUMMARY OF THE INVENTION

The present invention aims at providing a novel power dimmer which overcomes the disadvantages of conventional dimmers.

The present invention aims, more specifically, at providing a novel dimmer which is less bulky than a conventional dimmer.

The present invention also aims at maximizing the integration of such a dimmer.

The present invention aims, in particular, at providing a power dimmer which, while respecting the radiofrequency disturbance standards admissible on the mains, operates correctly at low power.

To achieve these and other objects, the present invention provides a power dimmer for a load powered by an a.c. voltage, of the type including a bidirectional switch associated in series with the load, the switch being normally closed and controllable to be opened upon each halfwave of the a.c. voltage.

According to an embodiment of the present invention, the switch is made bidirectional by means of a rectifying bridge, two output terminals of which provide a rectified a.c. voltage.

According to an embodiment of the present invention, the switch is formed by a first gate turn-off thyristor.

According to an embodiment of the present invention, a resistor of high value is placed between the anode and the gate of the first gate turn-off thyristor.

According to an embodiment of the present invention, the power dimmer includes a second gate turn-off thyristor in parallel with the first thyristor, the gate of the first thyristor being connected to the cathode of the second thyristor via a zener diode, the gate of the second thyristor being connected, via a resistor of high value, to its own anode, and the cathode of the second thyristor being connected, via a storage capacitor, to the most negative output terminal of the rectifying bridge.

According to an embodiment of the present invention, a control signal is applied between the gate of the first thyristor and its cathode, the trip voltage of an opening of the first thyristor being negative or null.

According to an embodiment of the present invention, the control signal is formed by a train of negative or null pulses at a frequency corresponding to double the frequency of the a.c. supply voltage.

According to an embodiment of the present invention, at least the gate of the first thyristor is connected to the most negative output terminal of the rectifying bridge, at least via a transistor, a control terminal of which is connected to the midpoint of a resistive dividing bridge between the two output terminals of the rectifying bridge.

According to an embodiment of the present invention, the voltage dividing bridge is sized so that the threshold turn-on voltage of the transistor is higher than the turn-on voltage of the first thyristor.

According to an embodiment of the present invention, the power dimmer includes a capacitor for damping the switching peaks upon opening of the switch.

The foregoing objects, features and advantages of the present invention, will be discussed in detail in the following non-limiting description of specific embodiments in connection with the accompanying drawings.

DETAILED DESCRIPTION

Figure 1:
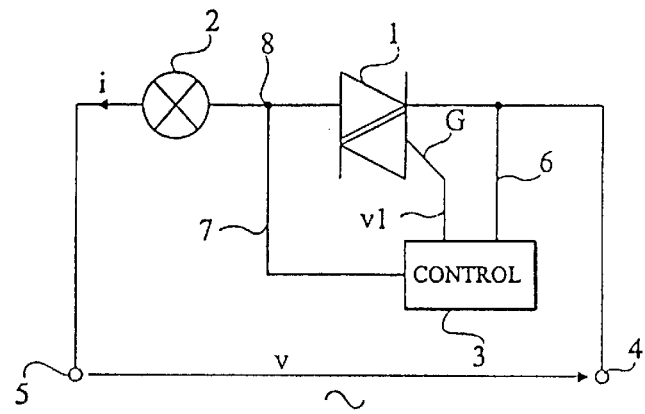
FIGS. 1 to 3, previously described, are meant to show the state of the art and the problem to solve.
Figure 2:
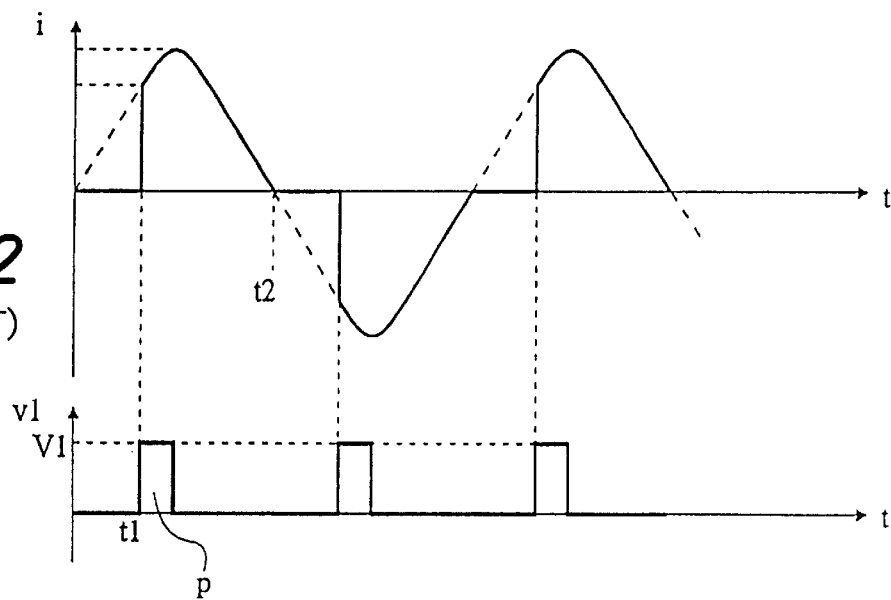
Figure 3:
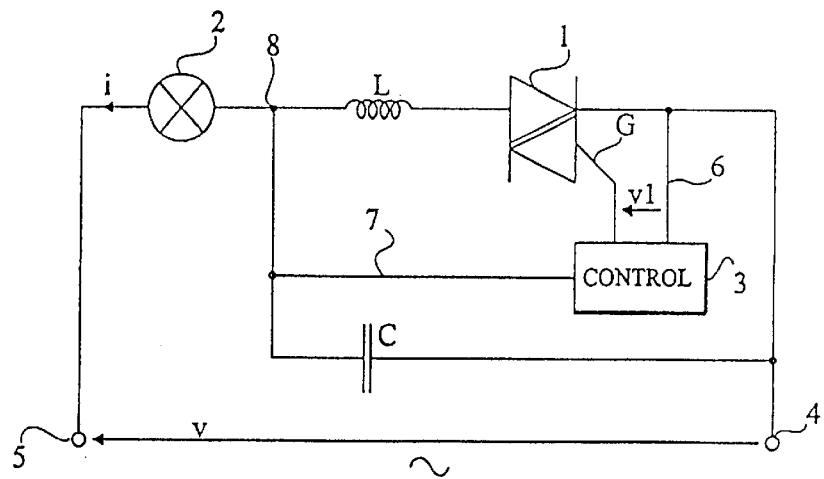

The same elements have been designated by the same references in the different drawings. For clarity, only those elements necessary to the understanding of the present invention have been shown in the drawings and will be described hereafter.

Figure 4:
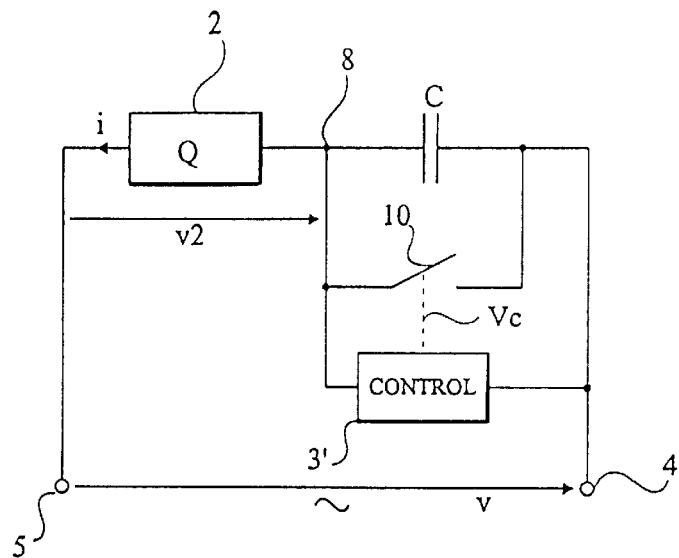
FIG. 4 schematically shows an embodiment of a power dimmer according to the present invention.

FIG. 4 shows, in a simplified way, a first embodiment of a power dimmer according to the present invention.

As previously, the dimmer is formed by a bidirectional switch 10 connected in series with a load 2, between two a.c. power supply terminals 4 and 5 that are, for example, connected to the mains. The dimmer also includes a circuit 3' for control (CONTROL) of switch 10, which provides, for example, a pulse train Vc at a frequency which is double the frequency of a.c. voltage v.

However, according to the present invention, switch 10 is a normally closed switch, controllable to be opened by means of circuit 3'. Thus, instead of causing, during each halfwave of the a.c. supply voltage, the closing of a switch enabling the passing of a current through the load, the load is supplied at the beginning of each halfwave and the switch is used, during each halfwave, to cut its power supply to modulate the effective current and, accordingly, the power of the load.

A capacitor C is mounted in parallel on switch 10, that is, capacitor C is connected between terminal 4 and midpoint 8 of the series association of load 2 with switch 10. The function of capacitor C here is to damp the current decrease in the lamp upon opening of switch 10, in order not to pollute the a.c. supply voltage with radiofrequency disturbances.

Figure 5:
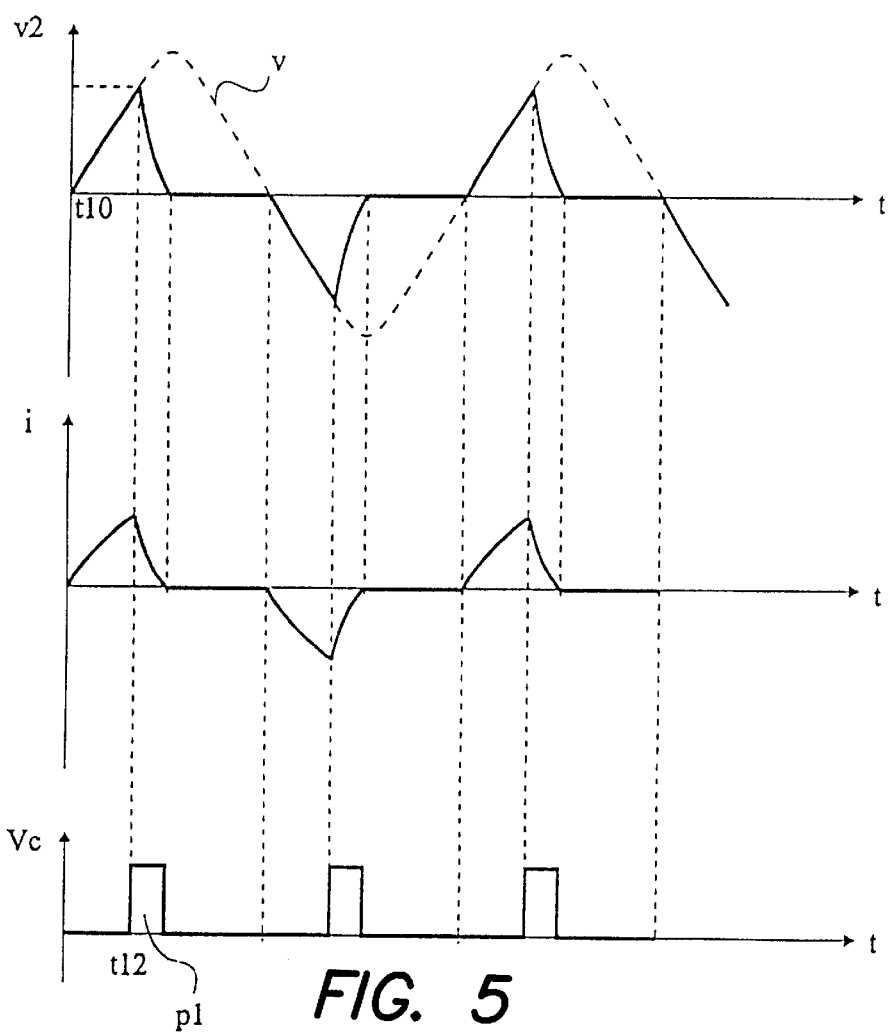
FIG. 5 illustrates, in the form of timing diagrams, the operation of a power dimmer according to the present invention.

FIG. 5 illustrates the operation of a power dimmer, such as shown in FIG. 4, and shows, in the form of timing diagrams, an example of shapes of voltage v2 across load 2, of current i and of signal Vc.

Since switch 10 is normally closed, the conduction starts under a zero voltage and voltage v2 follows the shape of the a.c. supply voltage from the voltage zero (time t10). Thus, the increase of current i through lamp 2 occurs smoothly. There is thus no need for an inductive filter to damp current i. At a time t12 of each halfwave, where a pulse P' appears on signal Vc, switch 10 opens and current i through lamp 2 decreases while being damped by capacitor C. Switch 10 closes back in the vicinity of the end of each halfwave.

The value of capacitor C is chosen according to the peak amplitude of a.c. voltage v. Indeed, the critical operating point corresponds to an opening of switch 10 at a time when supply voltage v is at its maximum amplitude. In this case, the current through capacitor C, which is zero as long as switch 10 is closed, abruptly becomes a maximum current. As a specific example, a capacitor of 100 nF is suitable for a mains voltage of 220 volts. Such a capacitor value is perfectly compatible with capacitors currently used in mains filters.

Figure 6:
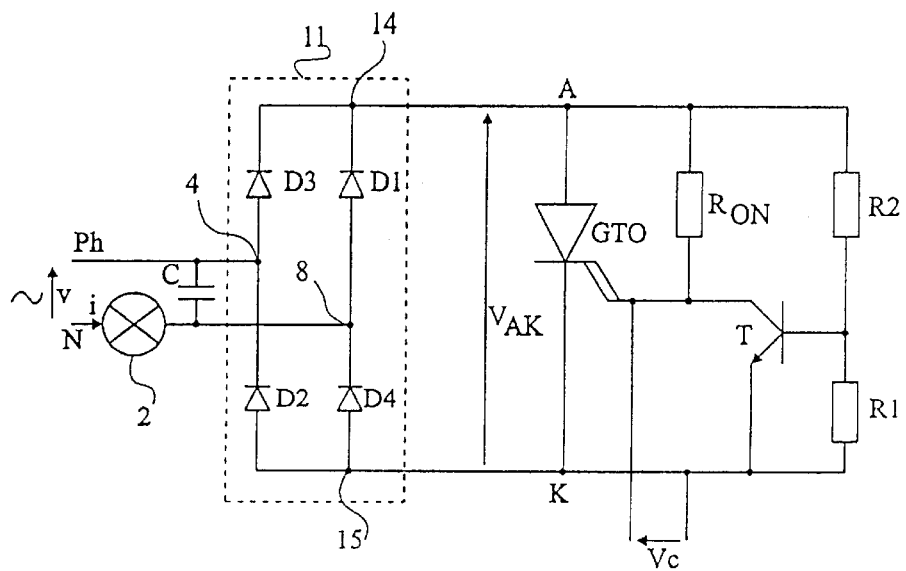
FIG. 6 shows a first embodiment of a switch constitutive of a power dimmer according to the present invention.

FIG. 6 shows an embodiment of a bidirectional switch normally closed and controllable to be opened according to the present invention.

According to this embodiment, switch 10 is formed by a gate turn-off thyristor (GTO) associated with a rectifying bridge 11. Bridge 11 is, for example, formed by a diode bridge D1, D2, D3, D4, including two input voltage terminals 4, 8 and two terminals 14, 15, that provide a rectified a.c. voltage. In the example shown, terminal 4 is connected to the phase (Ph) of the mains voltage and terminal 8 is connected, via lamp 2, to the neutral (N). Terminals 14 and 15 define, respectively, positive and ground terminals of the rectified a.c. voltage.

Thyristor GTO is connected to terminals 14 and 15, its anode (A) being connected to terminal 14. A resistor Ron is connected between the anode and the gate of thyristor GTO to make it normally closed.

Thyristor GTO is, preferably, associated with a transistor, for example, an NPN-type bipolar transistor T, the collector of which is connected to the gate of thyristor GTO and the emitter of which is connected to terminal 15. Two resistors R1 and R2 are connected in series between terminals 14 and 15. The midpoint of this series association is connected to the base of transistor T to form a dividing bridge setting the base potential of transistor T.

The function of transistor T, associated with resistors R1 and R2, is to enable the control of thyristor GTO from a pulsed control signal Vc applied between the gate and cathode K of thyristor GTO.

In the case where the switch is meant to form a power dimmer of a lamp 2, a capacitor C that damps the current peaks upon opening of thyristor GTO is, for example, connected between terminals 4 and 8. It should be noted that the capacitor of FIG. 6 may be replaced with a conventional assembly (not shown) using a capacitor in series with a diode between terminals 15 and 14, a resistor of low value being then mounted in parallel with this diode. In this case, resistor R2 is not connected to terminal 14 but is connected to terminals 4 and 8 via additional diodes, so that the voltage across resistors R1 and R2 can follow the shape of the rectified a.c. voltage.

The operation of a switch such as shown in FIG. 6 will be described hereafter in relation with FIG. 7 which shows, in the form of timing diagrams, an example of shapes of voltage $V_{AK}$ across thyristor GTO (between its anode and its cathode), of voltage $V_{GK}$ between the gate and the cathode of thyristor GTO, and of current i through lamp 2, during one period of a.c. supply voltage v.

Figure 7:
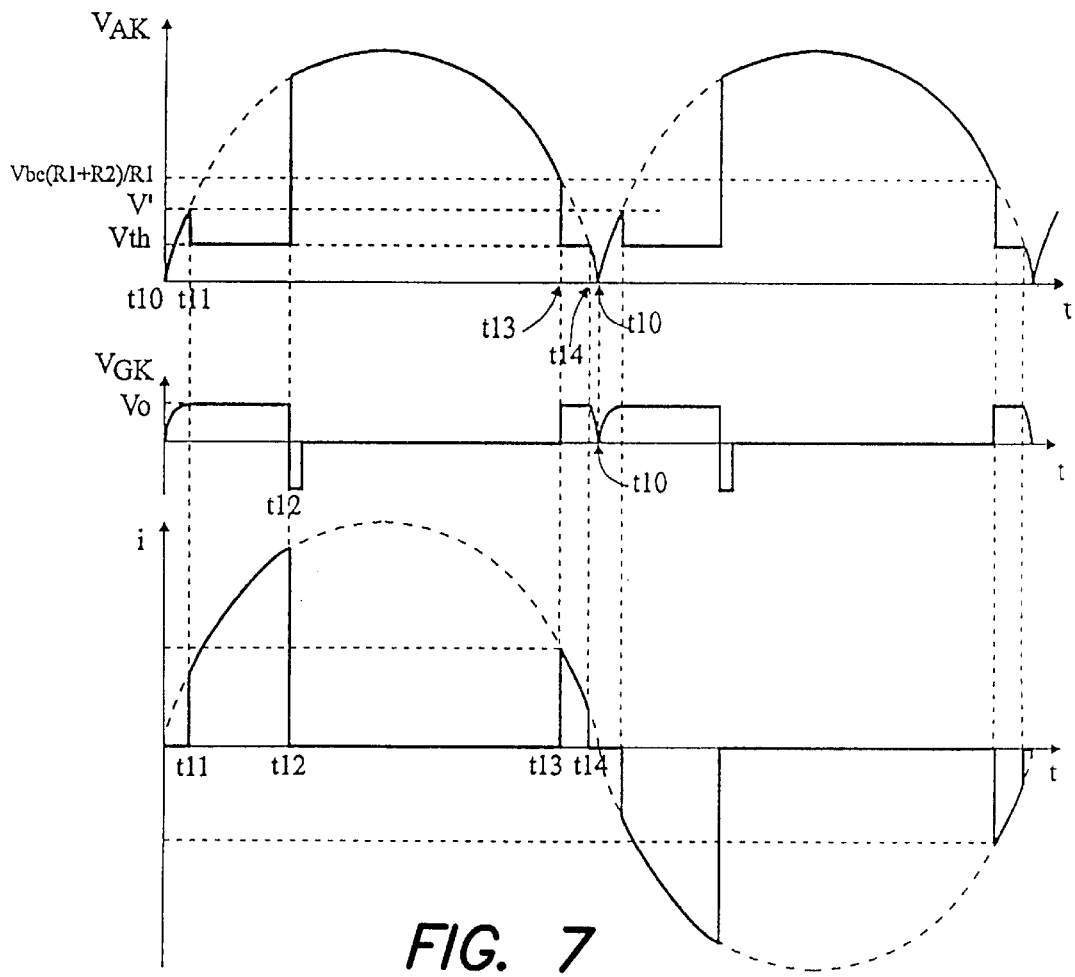
FIG. 7 illustrates, in the form of timing diagrams, the operation of a circuit such as shown in FIG. 6.

For simplification, the representation of FIG. 7 does not take into account the presence of capacitor C. It should only be noted that this capacitor smoothes the edges of voltage $V_{AK}$ and of current i which will be described hereafter.

For reasons of clarity, the amplitudes of the voltages characteristic of the operation of the switch shown in FIG. 6 have been exaggerated with respect to the amplitude of the mains a.c. voltage. It should however be noted that these voltages (on the order of 1 to 20 volts) are in practice much lower than the a.c. supply voltage (for example, 220 volts).

At the beginning of a halfwave (time t10), a current flows through resistor Ron, and from the gate of thyristor GTO to its cathode. As soon as voltage $V_{AK}$ reaches (time t11) a voltage V'=Ron.Igt+V0, where Igt represents the trip current of thyristor GTO and where V0 represents a positive voltage corresponding to the gate-cathode voltage of thyristor GTO in the closed state, setting the quiescent voltage of signal Vc, thyristor GTO turns on. At time t11, voltage $V_{AK}$ drops to value Vth (on the order of one volt) corresponding to the threshold voltage of thyristor GTO and a current flows through lamp 2.

Control signal Vc is formed by a train of negative or null pulses at a frequency which is double the frequency of the a.c. supply voltage.

It is assumed that at a time t12, signal Vc has a negative pulse of short duration. The duration of the pulse is set to enable the extraction of all carriers from the gate of thyristor GTO to open it. The negative or null potential of the pulse is set according to the current that thyristor GTO is meant to withstand to enable the extraction of the carriers from its gate.

Thyristor GTO thus turns off at time t12 and the current in the lamp disappears. Voltage $V_{AK}$ thus takes the shape of the rectified a.c. voltage and becomes higher than Vbe(R1+R2)/R1, where Vbe represents the base-emitter voltage drop of transistor T. At this time, transistor T saturates and maintains voltage $V_{GK}$ at a value close to 0 volts (in reality at the saturation collector-emitter voltage of the bipolar transistor), independent of control voltage Vc.

Transistor T turns off in the vicinity of the end of the halfwave, at the time (time t13) when voltage $V_{AK}$ becomes lower than Vbe(R1+R2)/R1. Since the pulse of signal Vc has disappeared, thyristor GTO turns on. Thyristor GTO remains closed until voltage $V_{AK}$ becomes lower than its threshold voltage Vth (time t14), then the current flows again through resistor Ron, the gate and the cathode of thyristor GTO until the end of the halfwave and the beginning of the next halfwave, where the operation described hereabove is repeated. A low current flows through the lamp between times t13 and t14.

For the assembly to operate properly, the following conditions must be met.

A first operating condition is that voltage V' (Ron.Igt+V0) must be lower than voltage Vbe(R1+R2)/R1, so that thyristor GTO is turned on at the beginning of each halfwave, before transistor T turns on. In the opposite case, thyristor GTO is permanently turned off.

A second condition is that resistor Ron has a high value, to protect the gate of thyristor GTO in case of a powering on in the middle of a halfwave, and so that potential V0 can be low (preferably, lower than 20 volts), so that thyristor GTO turns on as close as possible to the voltage zero.

A third condition is that the duration of a pulse of signal Vc must be sufficient for transistor T to be on, that is, for voltage $V_{AK}$ to reach voltage Vbe(R1+R2)/R1, before the pulse of signal Vc disappears. This condition is not illustrated by FIG. 7 since the effect of capacitor C has been neglected. Of course, in the presence of capacitor C, the peak of voltage $V_{AK}$ at time t12 is damped, which conditions the pulsewidth of signal Vc.

To light lamp 2 at full power, the pulses of signal Vc occur as close as possible to the end of each halfwave.

For an operation at minimum power, the pulses of signal Vc are as close as possible to the beginning of each halfwave. If the control circuit is designed to enable times t10 and t12 to be confounded, the width of the pulses of signal Vc will have to be higher than the time interval required for voltage $V_{AK}$ to reach voltage Vbe(R1+R2)/R1 so that thyristor GTO remains off until the end of the halfwave.

As an alternative implementation, the use of transistor T and of resistors R1 and R2 can be avoided by providing a control signal which is no longer pulsed, but remaining in the low state (0 volt or negative) until the end of each halfwave.

However, an advantage of the embodiment illustrated by FIG. 6 is that it keeps the conventional pulse control of a power dimmer.

An advantage of the present invention is that the power dimmer is of reduced weight and volume due to the absence of ferromagnetic devices (no inductive elements). All components of the dimmer, except for capacitor C, are integrable.

Another advantage of the present invention is that the switch does not create any oscillations upon switching at low power, conversely to a conventional switch requiring a mains filter.

Another advantage of the present invention is that the power dimmer has a control which is essentially based on simple low voltage components.

The power dimmer can appear in the form of a two-terminal device, which simplifies the wiring of such a dimmer realized in integrable form. For this purpose, the dimmer has to integrate a circuit (3', FIG. 4) for generating control signal Vc by drawing the power supply required by the circuit without requiring any further connection to the a.c. supply voltage.

Figure 8:
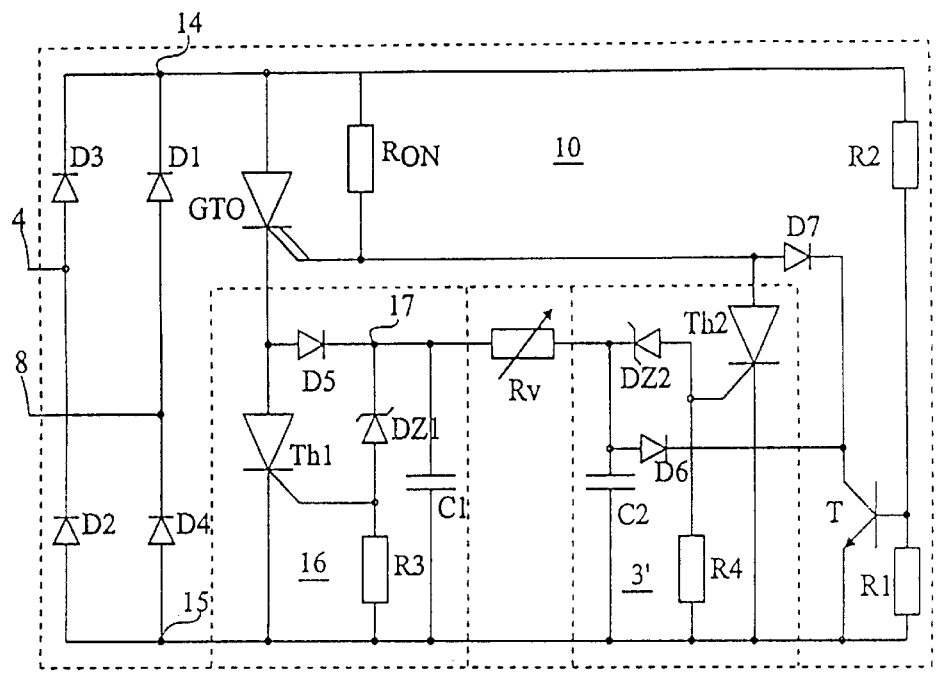
FIG. 8 shows the switch of FIG. 6, associated with a control circuit and with a power supply circuit for the control circuit.

FIG. 8 shows an embodiment of a power dimmer according to the present invention, reproducing the assembly of FIG. 6, and completed by a circuit 3' that generates the pulses required to control thyristor GTO and by a means 16 of supply of circuit 3'.

In this embodiment, the cathode of thyristor GTO is now connected to terminal 15 via a cathode-gate thyristor TH1. The gate of thyristor TH1 is connected to the anode of a zener diode DZ1, the cathode of which is connected to the cathode of thyristor GTO via a diode D5. A storage capacitor C1 is connected between anode 17 of diode DZ1 and terminal 15. Capacitor C1 forms a supply means of control circuit 3'.

Terminal 17 is connected, via a variable resistor Rv, to a first terminal of capacitor C2, a second terminal of which is connected to terminal 15. The first terminal of capacitor C2 is also connected, via a zener diode DZ2, to the gate of a thyristor TH2, the anode of which is connected to the gate of thyristor GTO and the cathode of which is connected to terminal 15.

The load (2, FIG. 6) and the capacitor (C, FIG. 6) for damping the switching edges of thyristor GTO have not been shown in FIG. 8.

Capacitor C1 charges at the beginning of each halfwave as long as the voltage across it has not reached the threshold voltage of zener diode DZ1. When diode DZ1 starts an avalanche, thyristor TH1 turns on and the current flowing through thyristor GTO then flows through thyristor TH1. This operation is repeated upon each halfwave of the a.c. supply voltage, so that, in the steady state, a more or less constant voltage is found across capacitor C1, which corresponds to the threshold voltage of zener diode DZ1.

The time (t12, FIG. 7) of occurrence of a control pulse for opening thyristor GTO is set by variable resistor Rv which conditions the time constant of cell RC formed of this resistor Rv and of capacitor C2. When the voltage across capacitor C2 becomes higher than the threshold voltage of zener diode DZ2, this diode starts an avalanche and turns on thyristor TH2 to open thyristor GTO by extraction of the carriers from its gate.

The value of capacitor C2 is much lower than the value of capacitor C1, so that the voltage across capacitor C1 remains substantially constant. It should be noted that capacitors C1 and C2 are low voltage capacitors. The threshold voltage of zener diode DZ2 is chosen to be lower than the threshold voltage of zener diode DZ1, so that diode DZ2 can start an avalanche by the discharge of capacitor C1.

The duration of a pulse is set by the time taken by thyristor TH2, when on, to extract all carriers from the gate of thyristor GTO. Once all these carriers have been extracted, thyristor TH2 opens. It should be noted that resistance Ron is high enough for the current flowing therethrough to be lower than the hold current of thyristor TH2 so that the latter can open.

A diode D6, mounted between the anode of zener diode DZ2 and the collector of transistor T, discharges capacitor C2 when transistor T turns on. Thus, the time interval between the beginning of a halfwave and time t12 of occurrence of a pulse of signal Vc is maintained constant for a given value of resistance Rv, the charge of capacitor C2 being null at the beginning of each halfwave. A diode D7, placed between the anode of thyristor TH2 and the collector of transistor T, prevents any looping of the current via diode D6 to the gate of thyristor GTO.

Resistors R3 and R4 connecting the respective gates of thyristors TH1 and TH2 to terminal 15 may be provided. The use of such resistors depends on the characteristics of the chosen thyristors TH1 and TH2 and, especially, on their respective gate resistances.

As a specific example of implementation, a circuit such as shown in FIG. 8 can be realized with the following values for the different components:

R1=4.7 kΩ;
R2=220 kΩ;
Ron=82 kΩ;
R3=75Ω;
R4=10 kΩ;
C1=220 µF;
C2=220 nF;
Rv is a 47 kΩ potentiometer mounted in series with a fixed resistor (not shown) of 2.2 Ω.;
DZ1=13 volts; and
DZ2=7.5 volts.

With such values, and for an a.c. supply voltage of 220 volts and an effective current of 3 A, the duration of the pulses of signal Vc is on the order of 100 µs.

Figure 9:
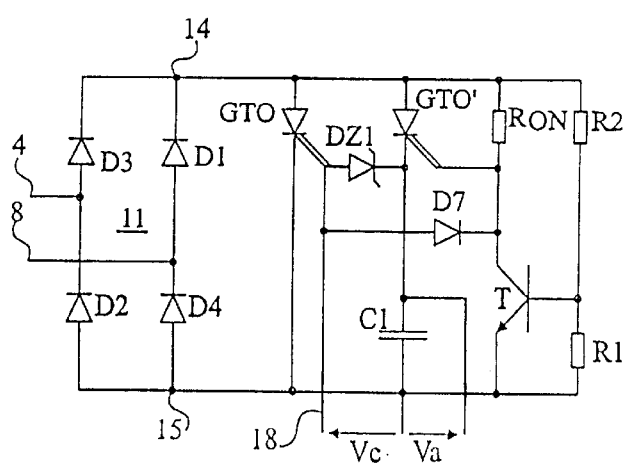
FIGS. 9 and 10 illustrate two other embodiments of a dimmer according to the present invention.

FIG. 9 shows a second embodiment of a bidirectional switch, normally closed and controllable to be opened, according to the present invention.

According to this embodiment, a second gate turn-off thyristor (GTO') is used to generate supply voltage Va for the control circuit (not shown).

Thyristor GTO is, as in the embodiment illustrated by FIG. 6, connected between terminals 14 and 15 of the rectifying bridge. The anode of thyristor GTO' is connected to terminal 14 and its cathode is connected, via storage capacitor C1, to terminal 15. A zener diode DZ1 is connected between the gate of thyristor GTO and the cathode of thyristor GTO'.

The gate of thyristor GTO (anode of diode DZ1) forms a positive terminal 18 of application of a pulsed control signal Vc. The generation circuit of signal Vc has not been shown in FIG. 9. It can be a circuit such as illustrated by FIG. 8 or any other adapted conventional assembly.

A diode D7 is connected between the gate of thyristor GTO and the collector of bipolar transistor T, the emitter of which is connected to terminal 15, and the base of which is connected to the midpoint of the series association of resistors R1 and R2. Resistor Ron is now placed between the anode and the gate of additional thyristor GTO', also connected to the collector of transistor T.

The operation of an assembly such as shown in FIG. 9 can be understood from the operations discussed in relation with FIGS. 6 and 8. The components which have been designated in FIG. 9 with the same references as components of FIG. 8 perform the same functions. Thus, diode DZ1 sets the voltage across storage capacitor C1. At the beginning of each halfwave, the conduction circuit of the load (not shown) is however closed here by thyristor GTO'. Once diode DZ1 has started an avalanche, thyristor GTO turns on and the load current then flows through thyristor GTO. As previously, thyristor GTO is turned off by a negative or null pulse of signal Vc and is maintained off until close to the end of the halfwave, independently from the shape of signal Vc, by means of transistor T at saturation until close to the end of the halfwave.

An advantage of the embodiment shown in FIG. 9 is that it minimizes the power dissipation during the periods when thyristor GTO is on. Indeed, the current flowing through the load no longer needs to flow through one of the components of the supply system (thyristor TH1 in FIG. 8). Thyristor GTO is now in parallel on the thyristor (here, thyristor GTO') associated with the charge of capacitor C1 of the supply circuit.

Another advantage of such an embodiment is that it uses an existing component, formed of two gate turn-off thyristors and of a zener diode connecting the gate of a first thyristor to the cathode of a second thyristor. Such a component is, for example, manufactured by SGS-THOMSON MICROELECTRONICS Company under the trade name EFS.

Figure 10:
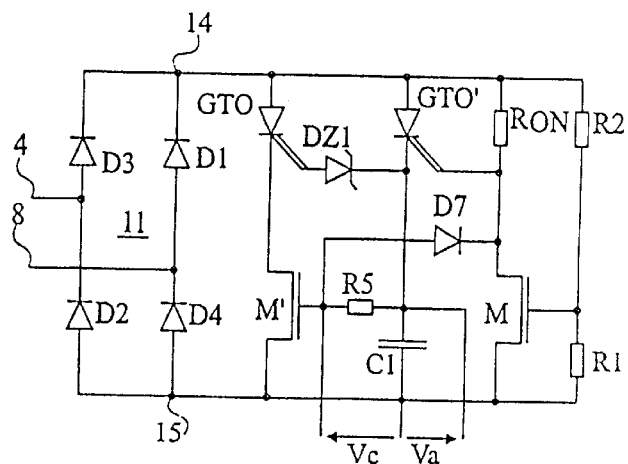

FIG. 10 shows an alternative of the embodiment illustrated by FIG. 9, in which bipolar transistor T is replaced with a MOS transistor M. The circuit operation is not altered by such a modification.

In FIG. 10, another alternative is illustrated. It is the addition of a second MOS transistor M' in series with thyristor GTO. The function of this transistor M' is to form a cascode-type assembly with thyristor GTO, so as to increase the cut-off ability of thyristor GTO, which enables operation at a greater power. To implement such an assembly, a resistor R5 is interposed between the gate of transistor M' and the gate of thyristor GTO and signal Vc is applied on the gate of transistor M'.

Of course, the present invention is likely to have various alterations, modifications, and improvements which will readily occur to those skilled in the art. In particular, the sizing of the different components will depend on the application for which the power dimmer is meant and, in particular, on the maximum power that it is supposed to withstand. Further, other control circuits 3' and supply circuits 16 as those illustrated in FIG. 8 may be used. Adaptations of the circuit according to the present invention to the use of such modified circuits are within the abilities of those skilled in the art.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A power dimmer for a load powered by an A.C. voltage comprising:
a bidirectional switch associated in series with the load, the switch being normally closed and controllable to be opened upon each halfwave of the A.C. voltage, wherein the switch is made bidirectional by means of a rectifying bridge, two output terminals of which provide a rectified A.C. voltage and is formed by a first gate turn-off thyristor having an anode, a cathode, and a gate, and wherein the power dimmer includes only a first terminal and a second terminal; and
a capacitor electrically connected between the first and second terminal that damps switching peaks associated with the opening of the bidirectional switch;
wherein the power dimmer does not include an inductive element.

2. The power dimmer of claim 1, including a second gate turn-off thyristor in parallel with the first thyristor, the gate of the first thyristor being connected to the cathode of the second thyristor via a zener diode, the gate of the second thyristor being connected, via a resistor of high value, to its own anode, and the cathode of the second thyristor being connected, via a storage capacitor, to the most negative output terminal of the rectifying bridge.

3. The power dimmer of claim 1, wherein a resistor of high value is placed between the anode and the gate of the first gat turn-off thyristor.

4. The power dimmer of claim 3, wherein a control signal is applied between the gate of the first thyristor and its cathode, the trip voltage of an opening of the first thyristor being negative or null.

5. The power dimmer of claim 4, wherein the control signal is formed by a train of negative or null pulses at a frequency corresponding to double the frequency of the a.c. supply voltage.

6. The power dimmer of claim 5, wherein at least the gate of the first thyristor is connected to the most negative output terminal of the rectifying bridge, at least via a transistor, a control terminal of which is connected to a midpoint of a resistive dividing bridge between the two output terminals of the rectifying bridge.

7. The power dimmer of claim 6, wherein the resistive dividing bridge is sized so that the threshold turn-on voltage of the transistor is higher than the turn-on voltage of the first thyristor.

8. The power dimmer of claim 1, wherein the first terminal is connected to A.C. voltage and the second terminal is connected to the load.

9. A load power controller for controlling an A.C. voltage delivered to a load, the load being connected directly to the A.C. voltage, the load power controller comprising;
a normally closed switch, said switch being formed by a first gate turn-off thyristor having a gate, an anode, and a cathode;
a rectifying bridge having two input terminals and two output terminals, the two input terminals being connected to the A.C. voltage and the two output terminals being connected to and in parallel with the switch to make the switch a bidirectional switch;
wherein the load power controller includes only a first terminal and a second terminal and does not include an inductive element; and
a capacitor electrically connected between the first and second terminal that damps switching peaks associated with the opening of the bidirectional switch.

10. The load power controller of claim 9, further comprising a transistor having a collector, an emitter, and a base, the collector of the transistor being connected to the gate of the first thyristor for enabling the first thyristor to be controlled by a pulsed control signal.

11. The load power controller of claim 10, wherein the base of the transistor is connected between first and second resistors, the first and second resistors being connected in series with each other and in parallel with the two output terminals of the rectifying bridge.

12. The load power controller of claim 10, wherein the control signal is formed by a train of negative or null pulses at a frequency corresponding to double frequency of the A.C. voltage supplied to the load.

13. The load power controller of claim 12, wherein the control signal is applied between the gate and the cathode of the first thyristor.

14. The load power controller of claim 9, further comprising a second gate turn-off thyristor, the second thyristor having an anode, a cathode, and a gate, the anode of the second thyristor being connected to the anode of the first thyristor, and the cathode of the second thyristor being connected to the gate of the first thyristor.

15. The load power controller of claim 14, further comprising a three terminal switch, a first terminal of the three terminal switch being connected to the gate of the second thyristor, the three terminal switch for enabling the second thyristor to generate a supply voltage for a control circuit.

16. The load power controller of claim 15, wherein a second terminal of the three terminal switch is connected between a pair of serially connected resistors.

17. The load power controller of claim 14, wherein the control circuit controls the conduction through the first thyristor.

18. The load power controller of claim 9, further comprising a resistor connected between the anode and the gate of the first thyristor.

19. The power dimmer of claim 9, wherein the first terminal is connected to the A.C. voltage and the second terminal is connected to the load.

20. A power dimmer for a load powered by an A.C. voltage comprising:
a normally closed switch coupled in series with the load, the switch being controllable to be opened at the beginning of each halfwave of the A.C. voltage; and
means for controlling the switch such that it behaves as a bidirectional switch and such that the voltage across the switch follows the A.C. voltage at the beginning of each half wave;
wherein the switch is formed by a first gate turn-off thyristor;
wherein the power dimmer includes only a first terminal and a second terminal and does not include an inductive element; and
a capacitor electrically connected between the first and second terminal that damps switching peaks associated with the opening of the bidirectional switch.

21. The power dimmer of claim 20, wherein the means for controlling includes:
a bridge rectifier coupled in parallel with the switch for providing a rectified A.C. voltage to the switch;
a pulse generator that supplies a negative or null voltage to the switch; and means for opening the switch in response to the negative or null voltage.

22. The power dimmer of claim 21, wherein the means for opening includes a transistor, a control terminal of which is connected between a pair of serial connected resistors.

23. The power dimmer of claim 20, wherein the first terminal is connected to the A.C. voltage and the second terminal is connected to the load.

* * * * *